(12) United States Patent
Li et al.

(10) Patent No.: US 9,354,394 B2
(45) Date of Patent: May 31, 2016

(54) OPTICAL COMPONENTS HAVING A COMMON ETCH DEPTH

(71) Applicant: Oracle International Corporation, Redwood City, CA (US)

(72) Inventors: Guoliang Li, San Diego, CA (US); Xuezhe Zheng, San Diego, CA (US); Ashok V. Krishnamoorthy, San Diego, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 105 days.

(21) Appl. No.: 13/890,140

(22) Filed: May 8, 2013

(65) Prior Publication Data

US 2013/0301981 A1 Nov. 14, 2013

Related U.S. Application Data

(60) Provisional application No. 61/646,094, filed on May 11, 2012.

(51) Int. Cl.
*G02B 6/136* (2006.01)
*G02B 6/122* (2006.01)
*G02B 6/12* (2006.01)

(52) U.S. Cl.
CPC ............... *G02B 6/136* (2013.01); *G02B 6/122* (2013.01); *G02B 6/12004* (2013.01); *G02B 6/12007* (2013.01)

(58) Field of Classification Search
CPC .... G02B 6/136; G02B 6/122; G02B 6/12004; G02B 6/12007; G02B 2006/12176
USPC ............ 385/14, 37, 129–132; 438/24, 31, 32, 438/40; 216/2, 24
See application file for complete search history.

(56) References Cited

U.S. PATENT DOCUMENTS 6,009,115 A * 12/1999 Ho ................................. 372/92
6,856,641 B2 * 2/2005 Ksendzov ..................... 372/108

(Continued)

OTHER PUBLICATIONS

Li, Guoliang et al, Ultralow-Loss, High Density SOI Optical Waveguide Routing for Macrochip Interconnects, Optics Express 12035, vol. 20, No. 11, May 21, 2012.

*Primary Examiner* — Daniel Petkovsek
(74) *Attorney, Agent, or Firm* — Park, Vaughan, Fleming & Dowler LLP (57) ABSTRACT

An optical device is described. This optical device includes multiple components, such as a ring resonator, an optical waveguide and a grating coupler, having a common etch depth (which is associated with a single etch step or operation during fabrication). Moreover, these components may be implemented in a semiconductor layer in a silicon-on-insulator technology. By using a common etch depth, the optical device may provide: compact active devices, multimode ultralow-loss optical waveguides, high-speed ring resonator modulators with ultralow power consumption, and compact low-loss interlayer couplers for multilayer-routed optical links. Furthermore, the single etch step may help reduce or eliminate optical transition loss, and thus may facilitate high yield and low manufacturing costs.

16 Claims, 5 Drawing Sheets

(56) References Cited

U.S. PATENT DOCUMENTS

| | | | |
|---|---|---|---|
| 6,865,314 B1 * | 3/2005 | Blair et al. | 385/27 |
| 6,885,689 B2 * | 4/2005 | Margalit et al. | 372/46.01 |
| 7,095,010 B2 * | 8/2006 | Scherer et al. | 250/227.11 |
| 7,245,803 B2 * | 7/2007 | Gunn et al. | 385/37 |
| 7,970,244 B2 * | 6/2011 | Krug et al. | 385/32 |
| 8,213,751 B1 * | 7/2012 | Ho et al. | 385/14 |
| 8,363,995 B2 * | 1/2013 | Gothoskar et al. | 385/131 |
| 9,020,001 B2 * | 4/2015 | Doerr | H01S 5/125 372/44.01 |
| 2004/0258360 A1 * | 12/2004 | Lim et al. | 385/43 |
| 2012/0063484 A1 * | 3/2012 | Goddard et al. | 372/94 |
| 2013/0279849 A1 * | 10/2013 | Santori et al. | 385/30 |
| 2013/0295688 A1 * | 11/2013 | Bailey et al. | 436/501 |

* cited by examiner

OPTICAL COMPONENTS HAVING A COMMON ETCH DEPTH

CROSS REFERENCE TO RELATED APPLICATION

This application claims priority under 35 U.S.C. §119(e) to U.S. Provisional Application Ser. No. 61/646,094, entitled "Enabling Multi-Layer-Routed Si-Photonic Links Using Single Step Waveguide Etching," by Guoliang Li, Xuezhe Zheng, and Ashok V. Krishnamoorthy, filed on May 11, 2012, the contents of which is herein incorporated by reference.

GOVERNMENT LICENSE RIGHTS

This invention was made with Government support under Agreement No. HR0011-08-9-0001 awarded by DARPA. The Government has certain rights in the invention.

BACKGROUND

1. Field

The present disclosure relates to the design of an optical device. More specifically, the present disclosure relates to the design of an optical device that includes components having a common etch depth.

2. Related Art

Engineers are beginning to investigate possible designs for a multi-chip module (which is sometimes referred to as a 'macrochip') that integrates processor chips and memory chips to enhance system performance. In order to function properly, the macrochip is expected to require high-bandwidth, high-density, low-latency and low-power interchip and intrachip optical communication networks. A variety of optical communication network topologies have been proposed, all of which include extensive optical-waveguide routing. With large-scale integration, the optical-waveguide routing length may be as long as 100 cm for some optical links, which requires ultralow-loss (such as less than 0.1 dB/cm) optical waveguides. Furthermore, high-density optical-waveguide routing (with tightly spaced parallel optical waveguides and tight bends) in the macrochip is also advantageous.

If the optical-waveguide routing is implemented on a single photonic layer, optical-waveguide crossings will be an essential element in the optical communication networks. Although optical-waveguide crossings can potentially be made with very low optical loss (for example, approximately 0.1 dB) and low crosstalk (such as −40 dB), they typically present severe constraints to the scaling of an optical communication network because a large number of optical-waveguide crossings may be needed for routing in a single photonic layer. One way to avoid this problem is to use multilayer routing, which avoids optical-waveguide crossings at the cost of interlayer optical couplers. However, if each optical link includes less than five interlayer hops, the optical loss due to the interlayer coupling can be less than 10 dB.

Because of the high index-of-refraction contrast in silicon optical waveguides and compatibility with CMOS fabrication, silicon photonics is a promising technology that can be used to implement the optical communication networks. While silicon optical waveguides can enable very compact optical devices, and thus can help provide low-power and high-density optical links, these optical waveguides also usually significantly increase the optical scattering loss at the optical-waveguide core-cladding boundary. For example, the pass-through optical loss of a compact sub-micron silicon optical waveguide is typically around 1-2 dB (or 10-20 dB/cm). In order to reduce the optical loss, a large optical mode is usually needed. However, this approach contradicts the requirements of high-density routing and low-power active devices.

Current techniques for addressing this problem usually involve complicated fabrication processes with multi-step etching operations. While these techniques can provide low-loss optical waveguides and low-power active devices, they often do not allow high-density routing because the optical-waveguide mode size is too large. In addition, the multi-step etching operations can cause additional optical loss at transition sections in the optical communication networks, and thus may reduce the yield.

Hence, what is needed is an optical link without the above-described problems.

SUMMARY

One embodiment of the present disclosure provides an optical device that includes: a substrate; a buried-oxide layer disposed on the substrate; and a semiconductor layer disposed on the buried-oxide layer, where the semiconductor layer includes a ring resonator, an optical waveguide and a grating coupler. Moreover, the ring resonator, the optical waveguide and the grating coupler are defined in the semiconductor layer using a common etch depth.

Note that the ring resonator may have a radius less than 10 μm and may be single mode. Furthermore, an optical loss of the optical waveguide at a wavelength and a data rate may be less than 1 dB/cm.

Additionally, the semiconductor layer may have a thickness and the etch depth is more than 50% of the thickness. For example, the thickness may be 300 nm and the etch depth may be greater than 200 nm.

In some embodiments, the substrate, the buried-oxide layer and the semiconductor layer constitute a silicon-on-insulator technology.

Moreover, at bends the optical waveguide may have a width between 400 and 500 nm. Alternatively or additionally, for routing segments the optical waveguide may have a width between 2 and 4 μm. In some embodiments, the optical waveguide includes sections having different widths, and the optical waveguide includes taper segments over a length between the sections having the different widths.

Another embodiment provides an electronic device that includes the optical device.

Another embodiment provides a method for fabricating the optical device. During the method, a photo-mask is used to define the ring resonator, the optical waveguide and the grating coupler in the semiconductor layer, where the semiconductor layer is disposed on the buried-oxide layer and the buried-oxide layer is disposed on the substrate. Then, a single etch operation is performed so that the defined ring resonator, the defined optical waveguide and the defined grating coupler have the common etch depth.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of an optical device, a system that includes the optical device, and a technique for fabricating the optical device are described. The optical device includes multiple components, such as a ring resonator, an optical waveguide and a grating coupler, having a common etch depth (which is associated with a single etch step or operation during fabrication). Moreover, these components may be implemented in a semiconductor layer in a silicon-on-insulator technology.

By using a common etch depth, this fabrication technique may simultaneously produce: compact active devices, multimode optical waveguides (including optical waveguides with tight bends, ultralow-loss routing optical waveguides, and optical-waveguide taper regions), high-speed ring resonator modulators with ultralow power consumption, and compact low-loss interlayer couplers for multilayer-routed optical links. The wide routing optical waveguide can be tightly spaced, for example, with a 5 µm pitch. This pitch, in conjunction with the tight bends, may enable high-density optical-waveguide routing. Moreover, the single etch step may help reduce or eliminate optical transition loss, and thus may facilitate high yield and low manufacturing costs. Therefore, the fabrication technique may facilitate interchip and intrachip optical interconnects using silicon photonics or wavelength-division-multiplexing silicon photonic links, as well as a high-performance system that include such photonic or optical links.

Figure 1:
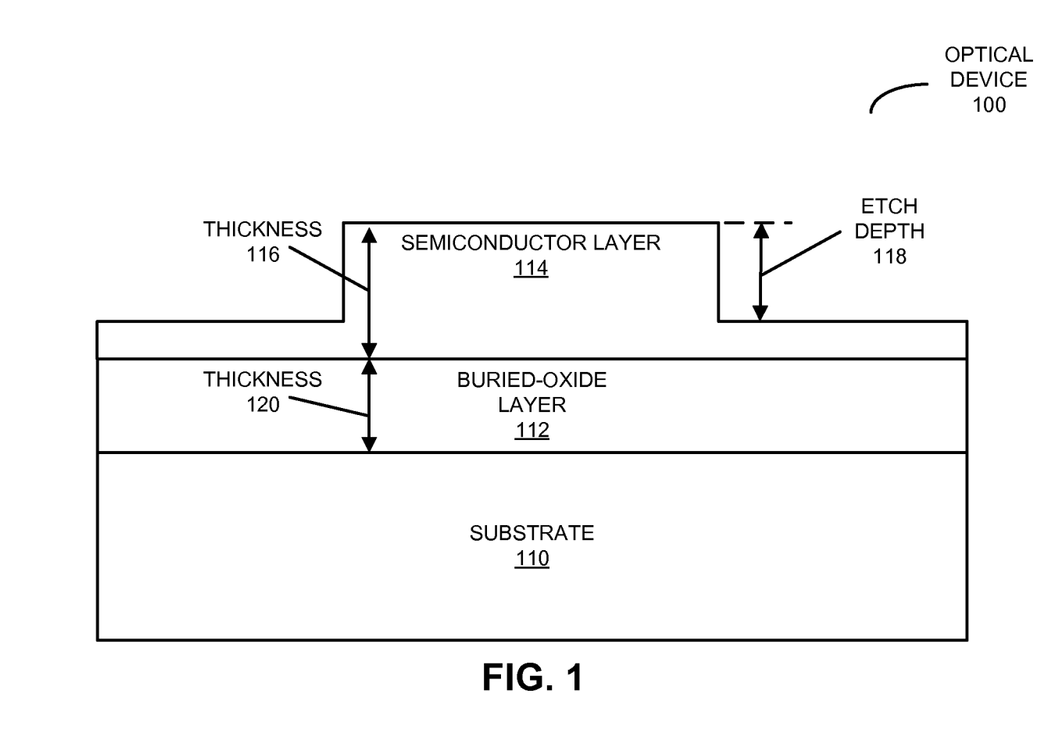
FIG. 1 is a block diagram of a side view of an optical device in accordance with an embodiment of the present disclosure.

We now describe embodiments of the optical device. FIG. 1 presents a block diagram of a side view of an optical device 100. This optical device includes: a substrate 110; a buried-oxide layer 112 disposed on substrate 110; and a semiconductor layer 114 disposed on buried-oxide layer 112. In some embodiments, substrate 110, buried-oxide layer 112 and semiconductor layer 114 constitute a silicon-on-insulator technology, i.e., substrate 110 and semiconductor layer 114 may be silicon, and buried-oxide layer 112 may be silicon dioxide.

Figure 2:
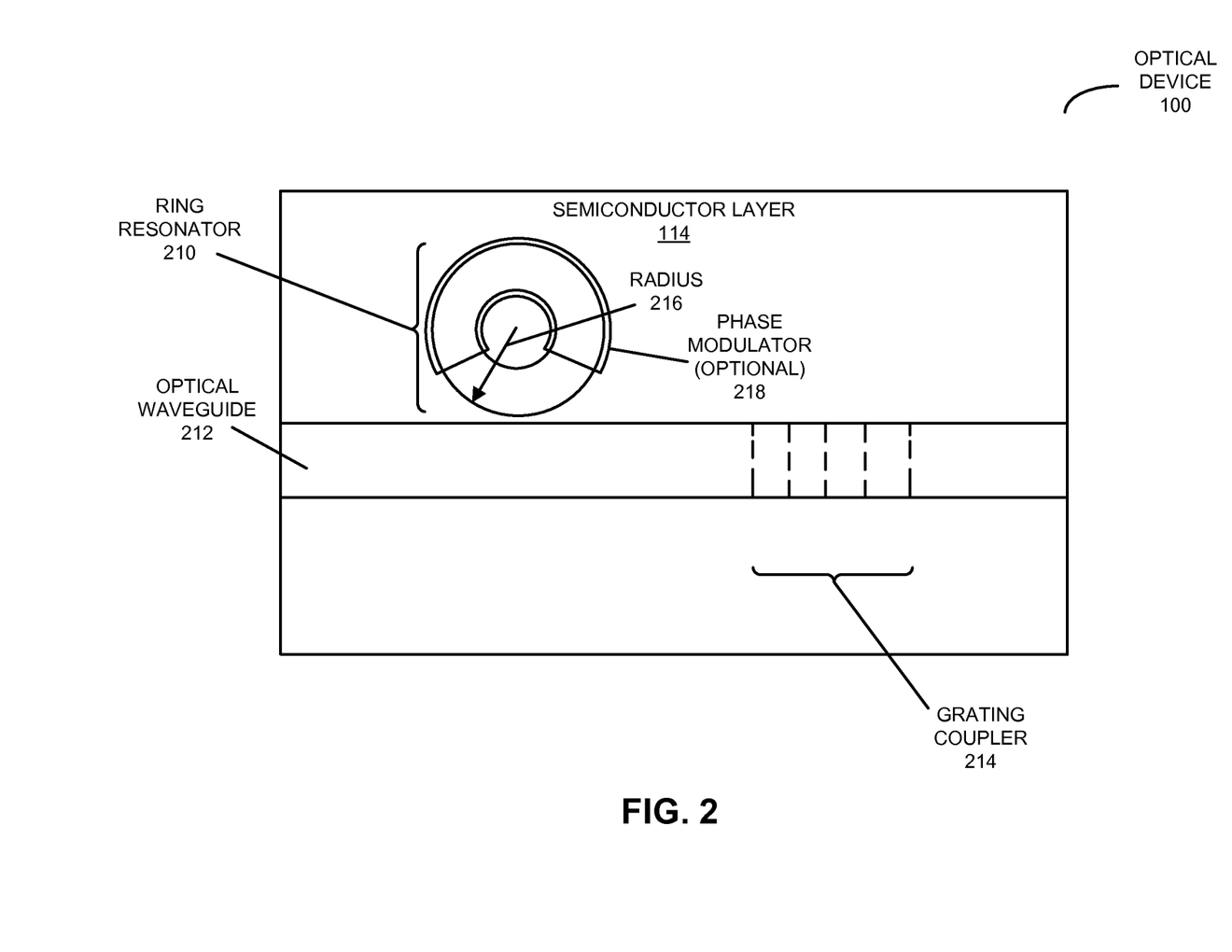
FIG. 2 is a block diagram of a top view of the optical device of FIG. 1 in accordance with an embodiment of the present disclosure.

As shown in FIG. 2, which presents a block diagram of a top view of an optical device 100, semiconductor layer 114 includes a ring resonator 210 (such as a ring-resonator modulator or a ring-resonator filter), an optical waveguide 212 and a grating coupler 214. Moreover, ring resonator 210, optical waveguide 212 and grating coupler 214 are defined in semiconductor layer 114 using a common etch depth. In particular, a single-step deep etch may be performed on optical waveguide 212 in semiconductor layer 114 to define ring resonator 210, optical waveguide 212 and grating coupler 214 for interlayer coupling (thus, the same optical waveguide may be used to implement these components). Note that ring resonator 210 may be separated from optical waveguide 212 by a gap of 200-300 nm. For a ring-resonator modulator or a ring-resonator filter, there is an optional phase modulator 218 disposed on top of the optical waveguide in ring resonator 210. Alternatively, for a ring-resonator multiplexer/demultiplexer, instead of optional phase modulator 218 a second optical waveguide (not shown) may be disposed on top of the optical waveguide in ring resonator 210.

In order to enable very compact devices, including small ring modulators and multiplexers/demultiplexers, semiconductor layer 114 may be thin in conjunction with a deep-etched ridge optical waveguide and narrow optical-waveguide width. For example, semiconductor layer 114 may have a thickness 116 (FIG. 1) of 300 nm, optical waveguide 212 may have a width of 380 nm, and etch depth 118 (FIG. 1) may be larger than 200 nm, such as 220 nm (thus, ring resonator 210, optical waveguide 212 and grating coupler 214 may each have a thickness or slab height of less than 100 nm). A 220 nm etch depth may result in a very compact optical mode, which, in turn, may enable ring resonator 210 to have a small radius 216 (such as less than 10 µm, e.g., 5 µm or 7.5-8 µm, as well as tight bends in optical waveguide 212 (e.g., a radius of 15-20 µm).

However, an optical waveguide with these dimensions can result in an optical loss greater than 2 dB/cm, which may be too lossy for long length routing. The optical loss of a silicon optical waveguide is mainly due to the scattering of the etched sidewalls, and is proportional to $\gamma \cdot (n_2^2 - n_1^2)$, where $\gamma$ is the optical intensity overlap with the sidewalls, $n_2$ is the optical refractive index of the silicon optical-waveguide core (approximately 3.5), and $n_1$ is the optical refractive index of the silicon-dioxide cladding (approximately 1.5). The high index-of-refraction contrast of silicon optical waveguides ($n_2^2 - n_1^2$ of approximately 10) makes the scattering loss much larger compared with other weakly guided optical waveguides ($n_2^2 - n_1^2$ less than 1).

Figure 3:
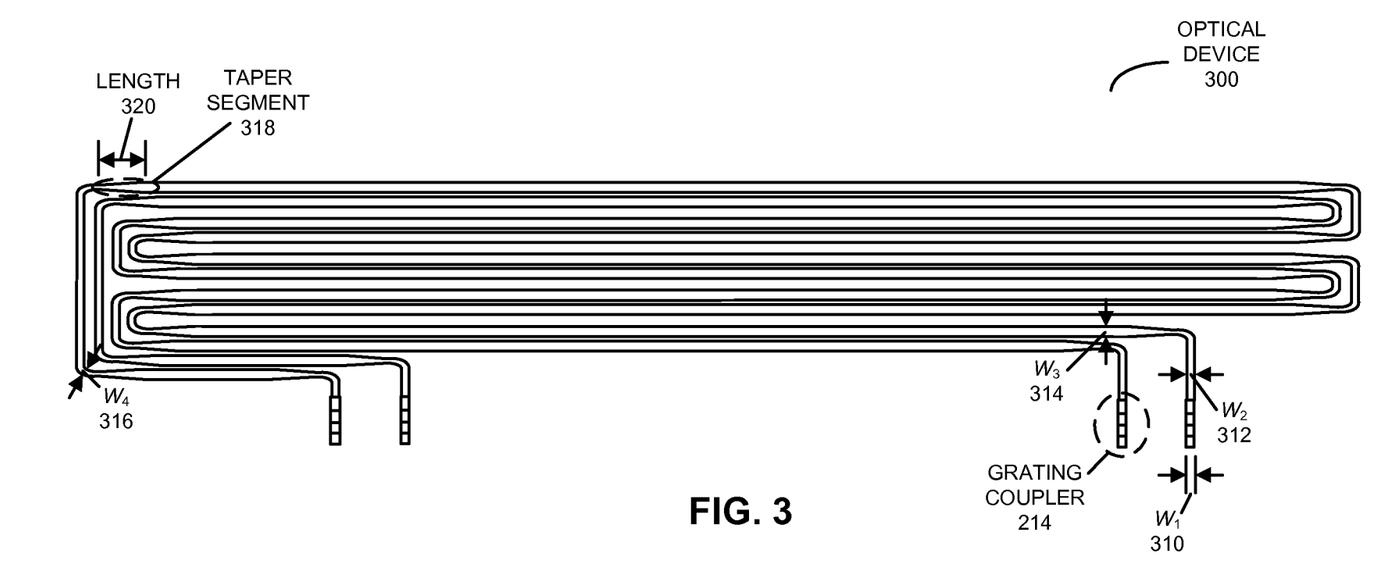
FIG. 3 is a block diagram of a top view of an optical device in accordance with an embodiment of the present disclosure.

As described further below with reference to FIG. 3, in order to reduce the scattering loss, a wide optical-waveguide width (e.g., 2-4 µm wide) may be used for routing sections of optical waveguide 212 so that the optical mode is well confined in the silicon core, and the optical overlap with the optical-waveguide sidewalls (i.e., $\gamma$) is reduced by 100 times or more. For example, the optical intensity overlap with the sidewalls may be approximately 300 times smaller in a 3-µm wide optical waveguide compared with a 380-nm wide optical waveguide. This geometry makes it possible to achieve ultralow loss and to have high-density routing. For example, two parallel optical waveguides with a 5 µm center-to-center spacing may have negligible crosstalk after propagating over 10 cm.

Thus, silicon photonic devices and optical links may be fabricated on silicon-on-insulator substrates with thin active silicon (a thickness less than 1 µm) and may use a single-step deep optical-waveguide etch. An etch depth 118 (FIG. 1) of more than 50% of thickness 116 (FIG. 1) may facilitate tighter bends with low optical loss so that compact, high-speed ring resonators with large free-spectral range can be achieved. (100% etched wire or channel optical waveguides may not be suitable for active devices, such as modulators, because they need a remaining silicon slab to apply the electric field.)

Note that there may be an optimum etch depth 118 (FIG. 1) associated with a given thickness 116 (FIG. 1) and a desired ring-resonator size. In particular, etching too deep may unnecessarily increase the optical loss and may also limit the ability to contact ring resonator 210 by increasing contact resistance. In general, etch depth 118 (FIG. 1) may represent a trade-off in the performance of ring resonator 210 and grating coupler 214. For example, a deeper etch depth 118 (FIG. 1) may compromise the performance of grating coupler 214. Similarly, a smaller etch depth 118 (FIG. 1) may increase the bandwidth of ring resonator 210, but may result in higher optical loss for ring resonator 210.

Referring back to FIG. 1, in an exemplary embodiment buried-oxide layer 112 has a thickness 120 between 0.1 and 10 μm, and thickness 116 is less than 0.5 μm. Moreover, an optical loss (such as a bending loss) of ring resonator 210 (FIG. 2) at a wavelength (such as 1.3 or 1.55 μm) and a data rate (such as greater than 10 Gb/s) may be 75 dB/cm, and an optical loss of optical waveguide 212 (FIG. 2) may be less than 1 dB. Furthermore, grating coupler 214 may have a 20×40 μm$^2$ size and less than 2.8 dB interlayer coupling loss (which can be further reduced using a local substrate removal on the backside of substrate 110 in FIG. 1 and by using a mirror coating). In some embodiments, optical device 100 is fabricated using a 130-nm CMOS manufacturing line.

As noted previously, with the single-step optical-waveguide etch, the width of optical waveguide 212 (FIG. 2) may vary for different components in optical device 100. In particular, as shown in FIG. 3, which presents a block diagram of a top view of an optical device 300, a relatively narrow optical-waveguide width ($W_1$) 310 (such as 300-400 nm) may be used for active devices to ensure compact size and low power. Moreover, a relatively narrow optical-waveguide width ($W_2$) 312 (such as 300-400 nm) may be used for short-length (such as tens of microns) straight optical-waveguide segments to ensure single mode. Alternatively, a wider (multimode) optical-waveguide width ($W_3$) 314 (such as 2-4 μm) may be used for longer optical-waveguide routing to ensure ultralow loss (e.g., 0.026 dB/cm). Furthermore, relatively narrow optical-waveguide width ($W_4$) 316 (such as between 400 and 500 nm, e.g., 480 nm) may be used for bends (S-bend, L-bend, etc.) to enable tight bending. In some embodiments, optical waveguide 212 includes taper segments (such as taper segment 318) over a length 320 (such as 50-100 μm) between sections in optical waveguide 212 that have different widths. For example, taper segments 318 may couple the narrow segments of optical waveguide 212 with the wider routing segments (i.e., between $W_2$ 312 and $W_3$ 314).

While the wide-routing segment of optical waveguide 212 supports multiple optical modes, note that only the fundamental optical mode may be excited because it is only used in straight sections. Moreover, taper segments 318 may convert the small optical mode to the fundamental mode in the wide-routing segments of optical waveguide 212.

While the components in the optical device are fabricated using a single-step optical-waveguide etch, additional etch steps or operations may be performed at locations far away from the optical mode of optical waveguide 212. For example, an isolation etching step or operation may be performed in a CMOS process for purposes of: thermal isolation, electrical isolation, or ion-diffusion isolation. Because this isolation etch does not interfere with the optical mode, it may not increase the optical loss or the yield loss.

The low-loss optical waveguide described above can achieve ultralow loss (less than 0.05 dB/cm) using passive-split wafers (e.g., pulled out after the optical-waveguide etch and oxide fill-in, with no other dielectric layer or metal layer disposed on top of optical waveguide 212). In general, the loss of optical waveguide 212 may be greater than 0.5 dB/cm for full-flow wafers, such as those fabricated using more processing steps and temperature cycles, and with all the dielectric and metal layers disposed on top of optical waveguide 212. Note that the optical waveguides on passive-split wafers may be used in optical communication networks or optical links that include multilayer routing. However, optical communication networks or optical links with single-layer routing may use the optical waveguides on full-flow wafers because these optical waveguides usually have to be integrated with other active optical devices.

The low-loss optical waveguides in the optical device (such as optical device 100 in FIGS. 1 and 2) may have a very small silicon core so that most of the optical-mode field spreads into the optical-waveguide cladding. Alternatively, the core may be very large in conjunction with a shallow ridge so that most of the optical-mode field is confined within the silicon core. Both of these approaches may minimize the optical overlap with the boundary.

Figure 4:
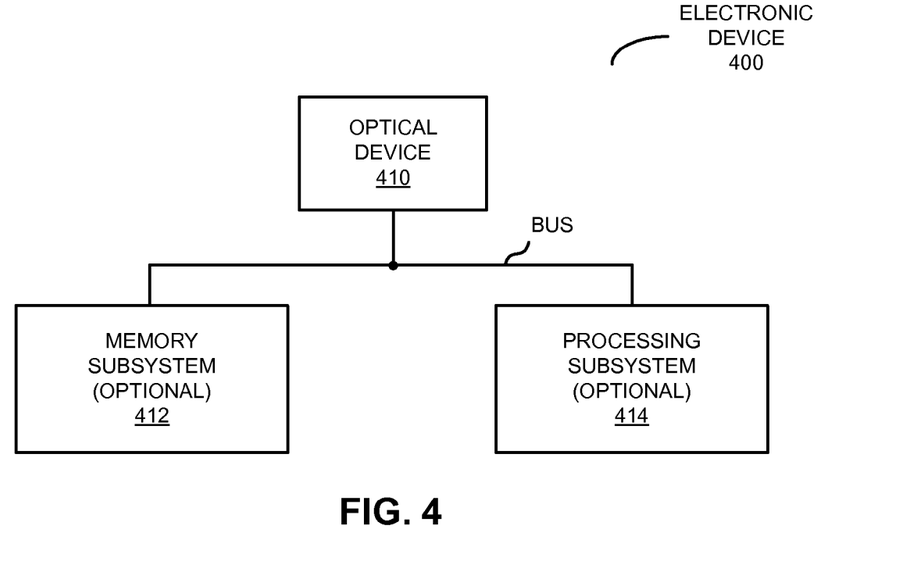
FIG. 4 is a block diagram illustrating a system that includes an optical device in accordance with an embodiment of the present disclosure.

One or more of the preceding embodiments of the optical device may be included in a system and/or an electronic device. FIG. 4 presents a block diagram illustrating an electronic device 400 that includes optical device 410.

In general, functions of optical device 100 (FIGS. 1 and 2), optical device 300 (FIG. 3) and electronic device 400 may be implemented in hardware and/or in software. Thus, electronic device 400 may include one or more program modules or sets of instructions stored in an optional memory subsystem 412 (such as DRAM or another type of volatile or non-volatile computer-readable memory), which may be executed by an optional processing subsystem 414. Note that the one or more computer programs may constitute a computer-program mechanism. Furthermore, instructions in the various modules in optional memory subsystem 412 may be implemented in: a high-level procedural language, an object-oriented programming language, and/or in an assembly or machine language. Note that the programming language may be compiled or interpreted, e.g., configurable or configured, to be executed by the processing subsystem.

Components in electronic device 400 may be coupled by signal lines, links or buses. These connections may include electrical, optical, or electro-optical communication of signals and/or data. Furthermore, in the preceding embodiments, some components are shown directly connected to one another, while others are shown connected via intermediate components. In each instance, the method of interconnection, or 'coupling,' establishes some desired communication between two or more circuit nodes, or terminals. Such coupling may often be accomplished using a number of circuit configurations, as will be understood by those of skill in the art; for example, AC coupling and/or DC coupling may be used.

In some embodiments, functionality in these circuits, components and devices may be implemented in one or more: application-specific integrated circuits (ASICs), field-programmable gate arrays (FPGAs), and/or one or more digital signal processors (DSPs). Furthermore, functionality in the preceding embodiments may be implemented more in hardware and less in software, or less in hardware and more in software, as is known in the art. In general, electronic device 400 may be at one location or may be distributed over multiple, geographically dispersed locations.

Electronic device 400 may include one of a variety of devices, including: a VLSI circuit, a switch, a hub, a bridge, a router, a communication device or system (such as WDM communication system), a storage area network, a data center, a network (such as a local area network), a computer system (such as a multiple-core processor computer system), a desktop or personal computer, a server (such as a multi-socket, multi-rack server), a work station, a mainframe computer, a blade, an enterprise computer, a supercomputer, a network-attached-storage (NAS) system, a storage-area-network (SAN) system, a laptop computer, a media player (such as an MP3 player), an appliance, a subnotebook/netbook, a tablet computer, a smartphone, a cellular telephone, a network appliance, a set-top box, a personal digital assistant (PDA), a toy, a controller, a digital signal processor, a game console, a device controller, a computational engine within an appliance, a consumer-electronic device, a portable computing device or a portable electronic device, a personal organizer, and/or another electronic device.

The preceding embodiments may include fewer components or additional components. For example, in FIG. 1 semiconductor layer 114 may include poly-silicon or amorphous silicon and/or substrate 110 may be one of multiple substrates in a multi-chip module (such as a multi-chip module in which alternating facing chips that include routing and bridge layers are coupled using optical proximity communication). Furthermore, a wide variety of fabrication techniques may be used to fabricate the optical device in the preceding embodiments, as is known to one of skill in the art. In addition, a wide variety of optical components may be used in or in conjunction with the optical device.

Although these embodiments are illustrated as having a number of discrete items, the embodiments of the optical device and the electronic device are intended to be functional descriptions of the various features that may be present rather than structural schematics of the embodiments described herein. Consequently, in these embodiments two or more components may be combined into a single component, and/or a position of one or more components may be changed.

While the preceding embodiments illustrate the use of the optical device in conjunction with an optical link, the optical device may be used in applications other than communications, such as: manufacturing (cutting or welding), a lithographic process, data storage (such as an optical-storage device or system), medicine (such as a diagnostic technique or surgery), a barcode scanner, entertainment (a laser light show), and/or metrology (such as precision measurements of distance).

In the preceding description, we refer to 'some embodiments.' Note that 'some embodiments' describes a subset of all of the possible embodiments, but does not always specify the same subset of embodiments.

Figure 5:
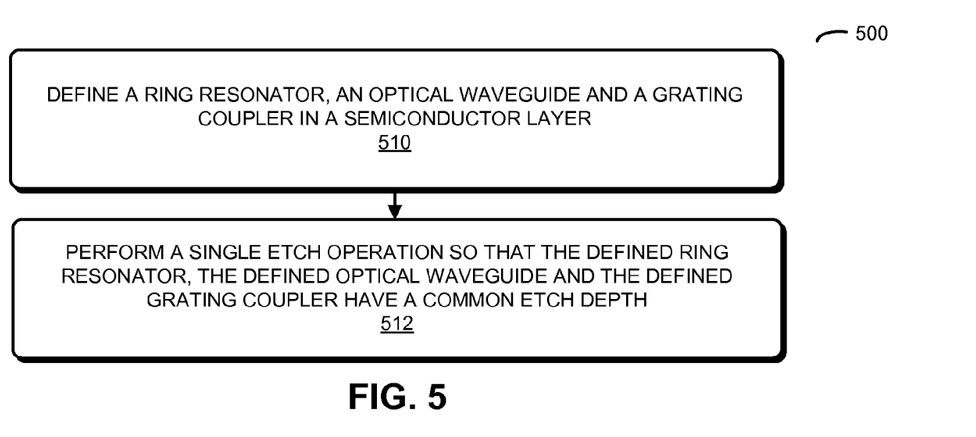
FIG. 5 is a flow chart illustrating a method for fabricating an optical device in accordance with an embodiment of the present disclosure.

We now describe embodiments of the method. FIG. 5 presents a flow chart illustrating a method 500 for fabricating an optical device, such as optical device 100 (FIGS. 1 and 2). During the method, a photo-mask is used to define the ring resonator, the optical waveguide and the grating coupler in the semiconductor layer (operation 510), where the semiconductor layer is disposed on the buried-oxide layer and the buried-oxide layer is disposed on the substrate. Then, a single etch operation is performed so that the defined ring resonator, the defined optical waveguide and the defined grating coupler have a common etch depth (operation 512).

In some embodiments of method 500, there may be additional or fewer operations. Moreover, the order of the operations may be changed, and/or two or more operations may be combined into a single operation.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An optical device, comprising:
   a substrate;
   a buried-oxide layer disposed on the substrate; and
   a semiconductor layer disposed on the buried-oxide layer, wherein the semiconductor layer includes a ring resonator, an optical waveguide and a grating coupler, wherein the optical waveguide comprises straight routing segments and bends to couple the straight routing segments, wherein the routing segments have a wider width than the bends to reduce optical loss on the routing segments and enable tight bending on the bends, wherein the semiconductor layer has a thickness and the etch depth is more than 50% but less than 100% of the thickness to leave a remaining silicon slab for active devices, and wherein the ring resonator, the optical waveguide and the grating coupler are defined in the semiconductor layer using a common etch depth.

2. The optical device of claim 1, wherein the ring resonator has a radius less than 10 μm and is single mode.

3. The optical device of claim 1, wherein an optical loss of the optical waveguide at a wavelength of at least 1.3 μm and a data rate of at least 10 Gb/s is less than 1 dB/cm.

4. The optical device of claim 1, wherein the thickness is substantially 300 nm and the etch depth is greater than 200 nm.

5. The optical device of claim 1, wherein the substrate, the buried-oxide layer and the semiconductor layer constitute a silicon-on-insulator technology.

6. The optical device of claim 1, wherein, at bends, the optical waveguide has a width between 400 and 500 nm.

7. The optical device of claim 1, wherein, for routing segments, the optical waveguide has a width between 2 and 4 μm.

8. The optical device of claim 1, wherein the optical waveguide includes sections having different widths; and
   wherein the optical waveguide includes taper segments over a length between the sections having the different widths.

9. An electronic device, comprising:
   a processor;
   a memory storing a program module that is configured to be executed by the processor; and
   an optical device, wherein the optical device includes:
   a substrate;
   a buried-oxide layer disposed on the substrate; and
   a semiconductor layer disposed on the buried-oxide layer, wherein the semiconductor layer includes a ring resonator, an optical waveguide and a grating coupler, wherein the optical waveguide comprises routing segments and bends, wherein the routing segments have a wider width than the bends to reduce optical loss on the routing segments and enable tight bending on the bends, wherein the semiconductor layer has a thickness and the etch depth is more than 50% but less than 100% of the thickness to leave a remaining silicon slab for active devices, and wherein the ring resonator, the optical waveguide and the grating coupler are defined in the semiconductor layer using a common etch depth.

10. The electronic device of claim 9, wherein the ring resonator has a radius less than 10 μm and is single mode.

11. The electronic device of claim 10, wherein an optical loss of the optical waveguide at a wavelength of at least 1.3 μm and a data rate of at least 10 Gb/s is less than 1 dB/cm.

12. The electronic device of claim 9, wherein the thickness is substantially 300 nm and the etch depth is greater than 200 nm.

13. The electronic device of claim 9, wherein the substrate, the buried-oxide layer and the semiconductor layer constitute a silicon-on-insulator technology.

14. The electronic device of claim 9, wherein, at bends, the optical waveguide has a width between 400 and 500 nm.

15. The electronic device of claim 9, wherein, for routing segments, the optical waveguide has a width between 2 and 4 µm.

16. The electronic device of claim 9, wherein the optical waveguide includes sections having different widths; and
   wherein the optical waveguide includes taper segments over a length between the sections having the different widths.

\* \* \* \* \*